(12) United States Patent
Li et al.

(10) Patent No.: US 11,556,812 B2
(45) Date of Patent: Jan. 17, 2023

(54) METHOD AND DEVICE FOR ACQUIRING DATA MODEL IN KNOWLEDGE GRAPH, AND MEDIUM

(71) Applicant: BEIJING BAIDU NETCOM SCIENCE AND TECHNOLOGY CO., LTD., Beijing (CN)

(72) Inventors: Qian Li, Beijing (CN); Yabing Shi, Beijing (CN); Haijin Liang, Beijing (CN); Yang Zhang, Beijing (CN); Yong Zhu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 462 days.

(21) Appl. No.: 16/749,029

(22) Filed: Jan. 22, 2020

(65) Prior Publication Data

US 2020/0242490 A1   Jul. 30, 2020

(30) Foreign Application Priority Data

Jan. 28, 2019   (CN) .......................... 201910081843.1

(51) Int. Cl.
*G06N 5/04*   (2006.01)
*G06F 16/21*   (2019.01)
(Continued)

(52) U.S. Cl.
CPC ............. *G06N 5/04* (2013.01); *G06F 16/212* (2019.01); *G06F 16/288* (2019.01); *G06F 40/253* (2020.01); *G06N 5/02* (2013.01)

(58) Field of Classification Search
CPC ....................................................... G06N 5/04
See application file for complete search history.

(56) References Cited

U.S. PATENT DOCUMENTS

2012/0084271 A1* 4/2012 Das ..................... G06F 16/2255
                                                              707/693
2015/0324454 A1   11/2015 Roberts et al.
(Continued)

FOREIGN PATENT DOCUMENTS

CN        102495892 A        6/2012
CN        108153901 A        6/2018
(Continued)

OTHER PUBLICATIONS

Office Action for Japanese Patent Application No. 2020-002943, dated Mar. 93, 2021, 3 pages.
(Continued)

*Primary Examiner* — Van H Oberly
(74) *Attorney, Agent, or Firm* — Fay Sharpe LLP

(57) ABSTRACT

Embodiments of the present disclosure provide to a method and a device for acquiring a data model in a knowledge graph, an apparatus and a storage medium. The method includes: receiving a knowledge entry describing a relationship between an entity and an object; determining a plurality of candidate object types of the object according to at least one of the entity, the relationship and the object; determining an object type for generating a data model that matches the knowledge entry from the plurality of candidate object types based on a preset rule; and generating the data model based at least on the object type.

19 Claims, 5 Drawing Sheets

(51) Int. Cl.
   *G06F 16/28* (2019.01)
   *G06F 40/253* (2020.01)
   *G06N 5/02* (2006.01)

(56) References Cited

U.S. PATENT DOCUMENTS

| | | | |
|---|---|---|---|
| 2016/0098645 A1* | 4/2016 | Sharma | G06F 16/313 706/12 |
| 2017/0032249 A1 | 2/2017 | Chougule et al. | |
| 2019/0042572 A1* | 2/2019 | Moreno | G06F 16/24522 |

FOREIGN PATENT DOCUMENTS

| | | |
|---|---|---|
| CN | 108182245 A | 6/2018 |
| JP | 2004036497 A | 2/2004 |
| JP | 2011108085 A | 6/2011 |
| JP | 2014504754 A | 2/2014 |
| JP | 2018085116 A | 5/2018 |
| JP | 2018156332 A | 10/2018 |
| KR | 101644044 B1 | 8/2016 |

OTHER PUBLICATIONS

Office Action for Korean Patent Application No. 10-2020-0002709, dated Feb. 18, 2021, 6 pages.
Natthawut Kertkeidkachorn, "An Automatic Knowledge Graph Creation Framework from Natural Language Text", The Institute of Electronics, Information and Communication Engineers, vol. E101-D, No. 1, Jan. 2018, 9 pages.
Office Action for EP Application No. 20153635.6, dated Jun. 26, 2020, 10 pages.
Fader et al., "Identifying Relations for Open Information Extraction", University of Washington, Seattle, {afader, soderlan, etzioni}@cs.washington.edu, 12 pages.
Office Action for Chinese Application No. 201910081843.1, dated Jul. 22, 2020, 20 pages.

* cited by examiner

METHOD AND DEVICE FOR ACQUIRING DATA MODEL IN KNOWLEDGE GRAPH, AND MEDIUM

CROSS-REFERENCE TO RELATED APPLICATIONS

This application claims priority to and benefits of Chinese Patent Application No. 201910081843.1, filed with the National Intellectual Property Administration of P. R. China on Jan. 28, 2019, the entire contents of which are incorporated herein by reference.

FIELD

Embodiments of the present disclosure relate to the field of computers, and more particularly, to a method for acquiring a data model in a knowledge graph, a device, a device and a medium.

BACKGROUND

In order to facilitate the construction of the knowledge graph, it is expected to mine and summarize schemas of various fields with data from different sources.

SUMMARY

According to a first aspect of the present disclosure, a method for acquiring a data model in a knowledge graph is provided. The method includes: receiving a knowledge entry describing a relationship between an entity and an object; determining a plurality of candidate object types of the object according to at least one of the entity, the relationship and the object; determining an object type for generating a data model that matches the knowledge entry from the plurality of candidate object types based on a preset rule; and generating the data model based at least on the object type.

According to a second aspect of the present disclosure, a device for acquiring a data model in a knowledge graph is provided. The apparatus includes one or more processors, and a storage device configured to store one or more programs. When the one or more programs are executed by the one or more processors, the one or more processors are caused to implement the method according to embodiments of the present disclosure.

According to a third aspect of the present disclosure, a computer readable storage medium having a computer program stored thereon is provided. When the computer program is executed by a processor, the method according to embodiments of the present disclosure is implemented.

It should be understood that the content described in the summary of the present disclosure is neither intended to limit key or important features of the embodiments of the present disclosure, nor intended to limit the scope of the present disclosure. Other features of the present disclosure will be readily understood through the following description.

BRIEF DESCRIPTION OF THE DRAWINGS

The features, advantages and aspects of embodiments of the present disclosure will become more apparent from the accompanying drawings and with reference to the following detailed description. In the drawings, the same or similar reference numerals indicate the same or similar elements, in which.

DETAILED DESCRIPTION

Figure 1:
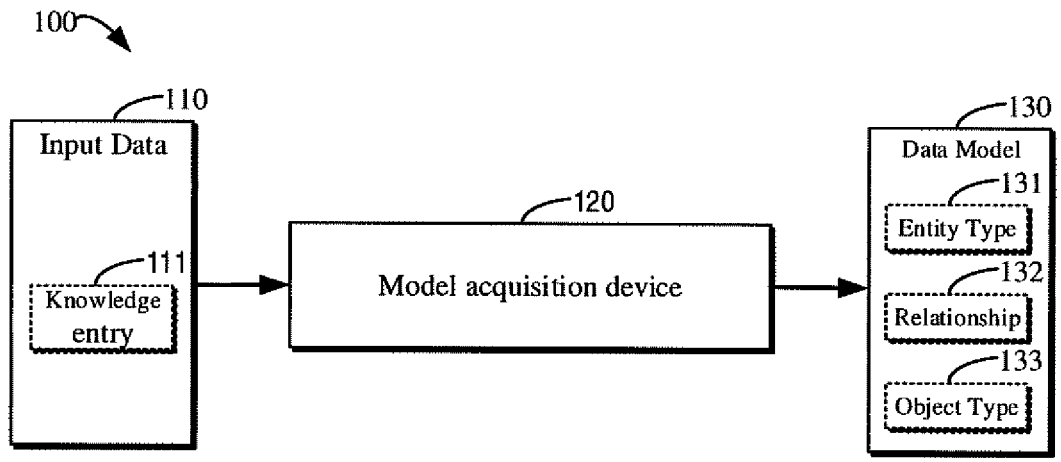
FIG. 1 is a schematic diagram of an exemplary system according to some embodiments of the present disclosure.

Embodiments of the present disclosure will be described in more detail below with reference to the accompanying drawings. While some embodiments of the present disclosure have been illustrated in the accompanying drawings, it is to be understood that the present disclosure may be embodied in various forms and should not be construed as limited to the embodiments set forth herein. Instead, these embodiments are provided so that the present disclosure will be understood thoroughly and completely. It should be understood that the drawings and embodiments of the present disclosure are for illustrative purposes only, and are not intended to limit the present disclosure.

In the description of the embodiments of the present disclosure, the term "including" and its equivalents should be construed as open inclusion, i.e., "including, but not limited to". The term "based on" should be understood as "at least partially based on". The term "one embodiment" or "the embodiment" should be understood as "at least one embodiment". Terms "first" "second" and the like may refer to different or identical objects. Other explicit and implicit definitions may also be included below.

The knowledge graph, also known as knowledge base, is configured to describe various entities, concepts, their relationships, and their respective attributes in the world. The knowledge graph is widely used in search, artificial intelligence, deep learning and other fields. In the knowledge graph, schema is configured to describe a data model of a domain, which may include entity types in the field, the relationship (or property) associated with the entity types, and the object (or an attribute value) type having the relationship with the entity type. For example, for the knowledge entry "the composer of Tenderness is Mayday", the corresponding data model may be expressed as "music-composer-person".

In the knowledge graph, schema may be configured to describe a data model of a domain, which may include entity types in the domain, the relationships (or attributes) associated with the entity types, and the object types (or attribute values) having relationship with the entity types. The entity type may refer to the category to which the entity belongs, which may generally be expressed by the hypernym of the phrase describing the entity. The object type may refer to the category to which the object (e.g., attribute value of the entity, or another entity having a relationship with the entity)

associated with the entity belongs, which may generally be expressed by the hypernym of the phrase describing the object.

As an example, for a knowledge entry "the composer of Tenderness is Mayday" in a subject-predicate-object (SPO) form, it includes the subject "Tenderness" describing the entity, the predicate "composer" describing the relationship, and the object "Mayday" describing the object. In the example, the type of the entity "Tenderness" (the entity type, also referred as SType) may be, for example, "music", the relationship may be, for example, "composer", and the type of the object "Mayday" (the object type, also referred as OType) may be, for example, "person". The data model or the schema corresponding to the knowledge entry "the composer of Tenderness is Mayday" may be expressed as "music-composer-person".

In order to facilitate the construction of the knowledge graph, it may be expected to mine and summarize the data model in various fields based on knowledge entries from different sources. There may be a plurality of hypernyms for the same object, for example, the hypernym of the object "Mayday" may include musician, person, or thing, and there may be more than one object type corresponding to the same knowledge entry. In this case, in order to build the data model, it is necessary to determine the object type that best matches the semantics of the knowledge entry. In addition, the degree of generalization of the object type determined should be appropriate, neither too general nor too detailed.

In the related art, the object type in the data model are manually edited, or the object types in the data model are reused, which have different degrees of external dependencies.

According to some embodiments of the present disclosure, a solution for acquiring a data model in a knowledge graph is provided. With the solution, the object types may be automatically summarized and mined from knowledge entries in the SPO form, the data model in the knowledge graph may be efficiently constructed while effectively reducing labor costs, and the object type in the data model automatically constructed can have an appropriate degree of generalization in addition to eliminating external dependencies.

In the following, embodiments of the present disclosure will be described in detail below with reference to the accompanying drawings.

FIG. 1 is a schematic diagram of an exemplary system 100 according to some embodiments of the present disclosure. As illustrated in FIG. 1, the system 100 may include a model acquisition device 120. It should be understood that, the structures and functions of the system 100 illustrated in FIG. 1 are for exemplary purposes only, and are not intended to imply any limitation on the present disclosure. Embodiments of the present disclosure may also be applied to conditions having different structures and/or functions.

The model acquisition device 120 may receive input data 110 from multiple data sources. As illustrated in FIG. 1, the input data 110 may include, for example, knowledge entries 111 in the SPO form. As an example, for the knowledge entry 111 "the composer of Tenderness is Mayday", it describes another entity "Mayday" that has a relationship such as "composer" with the entity "Tenderness". As an example, for a knowledge entry 111 "the birthday of Jacky Cheung is July 10", it describes the attribute value "July 10" of the attribute "birthday" of the entity "Jacky Cheung". In the present disclosure, the attribute value of the entity or another entity having a relationship with the entity are collectively referred to as "object," such as "Mayday" and "July 10" in the above examples.

The model acquisition device 120 may generate a data model 130 matching the knowledge entry 111. As illustrated in FIG. 1, the data model 130 may include an entity type 131, a relationship 132, and an object type 133. As an example, for the knowledge entry "the composer of Tenderness is Mayday", its entity type may be, for example, "music", the relationship is "composer", and object type may be, for example, "person", and the data model matching it may be expressed as "music-composer-person". For example, for the knowledge entry "the birthday of Jacky Cheung is July 10", its entity type may be, for example, "person", the relationship is "birthday", and the object type may be, for example, "time", and the data model matching it may be expressed as "person-birthday-time".

As described above, in order to obtain the data model 130 matching the knowledge entry 111, the model acquisition device 120 needs to determine the entity type 131, the relationship 132 and the object type 133 corresponding to the knowledge entry 111. In an example, the model acquisition device 120 may determine the entity type 131 or the relationship 132 based on any method or technique known or to be developed in the related art, which is not described in the present disclosure. In the following, the acts of the model acquisition device 120 determining the object type 133 corresponding to the knowledge entry 111 will be described in detail with reference to the accompanying drawings.

Figure 2:
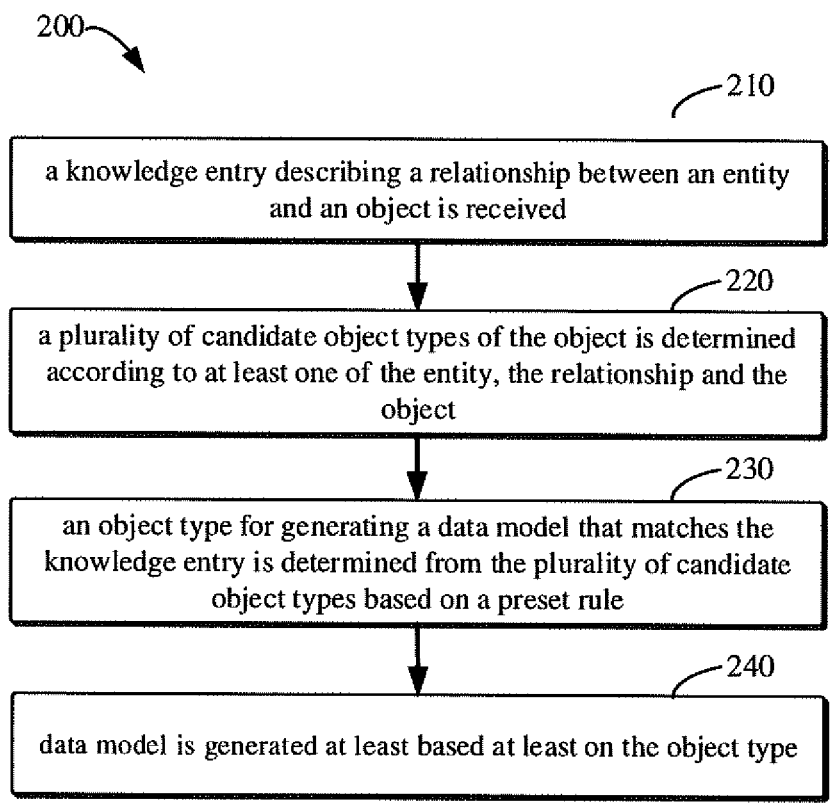
FIG. 2 is a flowchart of a method for acquiring a data model in a knowledge graph according to some embodiments of the present disclosure.

FIG. 2 is a flowchart of a method 200 for acquiring a data model in a knowledge graph according to some embodiments of the present disclosure. In an example, the method 200 may be performed by the model acquisition device 120 illustrated in FIG. 1. The method 200 will be described in detail below with reference to FIG. 1. It should be understood that, the method 200 may also include additional blocks not shown, and/or the blocks shown may be omitted, the present disclosure is not limited in this respect.

At block 210, a knowledge entry describing a relationship between an entity and an object is received.

In an embodiment, the model acquisition device 120 may receive the knowledge entry 111 describing the relationship between the entity and the object. For example, the knowledge entry 111 "the composer of Tenderness is Mayday" describes another entity "Mayday" that has the relationship such as "composer" with the entity "Tenderness".

At block 220, a plurality of candidate object types of the object is determined according to at least one of the entity, the relationship and the object.

In an embodiment, the model acquisition device 120 may determine a plurality of candidate object types of the object according to at least one of the entity, the relationship and the object.

Figure 3:
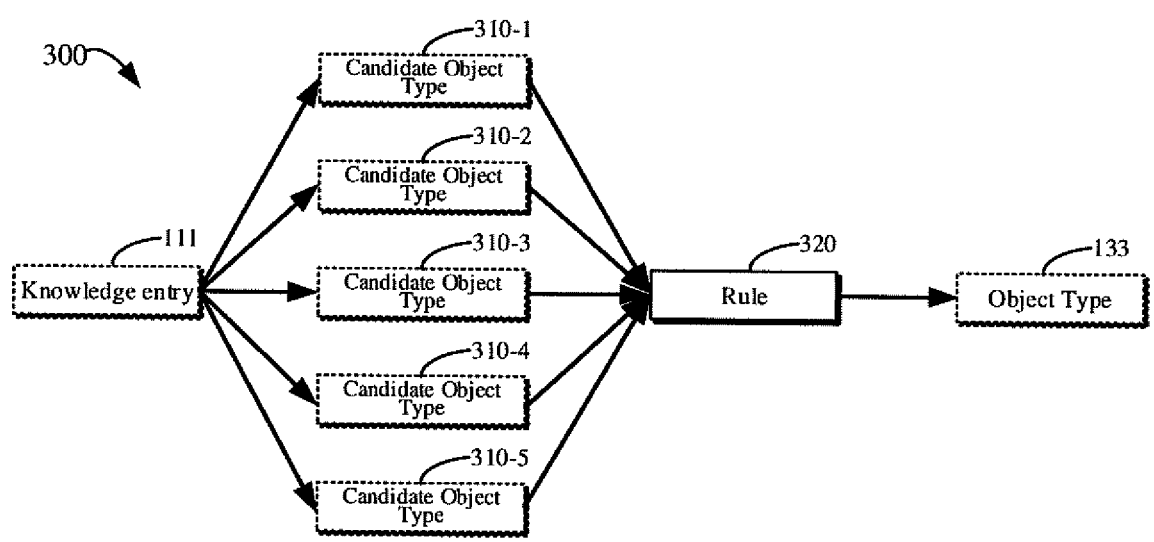
FIG. 3 is a schematic diagram of an exemplary process of determining an object type for generating a data model according to some embodiments of the present disclosure.

FIG. 3 is a schematic diagram of an exemplary process of determining an object type for generating a data model according to some embodiments of the present disclosure. For example, FIG. 3 illustrates a plurality of candidate object types 310-1, 310-2 . . . 310-5 (collectively referred to as "candidate object types 310" or "candidate types 310") corresponding to the object in the knowledge entry 111 as determined by the model acquisition device 120. Block 220 is described in detail below in combination with FIG. 3. Although five candidate object types corresponding to the knowledge entry 111 are shown in FIG. 3, the five candidate object types are for exemplary purposes only and are not intended to limit the scope of the present disclosure. It should be understood that, the model acquisition device 120 may determine more or less candidate object types than the number shown in FIG. 3.

In some embodiments, the model acquisition device 120 may divide the phrase (also referred to as the predicate) describing the relationship in the knowledge entry 111 into a plurality of words, and determine a first candidate object type 310-1 of the object according to one of the plurality of words.

As an example, for the knowledge entry "the business hours of McDonald's are 0:00 to 24:00", the predicate is the business hour. For example, the model acquisition device 120 may divide the predicate "business hour" into two words, namely "business" and "hour", in which business is an adjective, and hour is a noun. The model acquisition device 120 may determine the candidate type of the object "0:00-24:00", such as time, according to the noun hour. Additionally, in some embodiments, the model acquisition device 120 may be configured with, for example, a predetermined object type set. In an example, the model acquisition device 120 may determine the noun "time" as the candidate type of the object "0:00-24:00" only when the noun time matches a predetermined object type in the predetermined object type set.

In some embodiments, the model acquisition device 120 may determine whether the object matches a predetermined non-transaction type. When the model acquisition device 120 determines that the object in the knowledge entry matches the predetermined non-transaction type, the model acquisition device 120 may determine the predetermined non-transaction type as a second candidate object type 310-2 of the object. In some embodiments, the model acquisition device 120 may determine whether the object matches the predetermined non-transaction type by parsing the part-of-speech of the phrase (i.e., the object in the SPO) describing the object. In an example, the predetermined non-transaction type may include one of a text type (e.g., a uniform resource locator, etc.), a time type (e.g., a date or a time interval, etc.), a numeric type (e.g., a floating point number, an integer, etc.), a quantity type (including numbers and measurements, e.g., 8 pieces, 6 bunches, 2 days, etc.), and an enumeration type (e.g., a relationship enumeration, an index enumeration, a value type enumeration, a Boolean enumeration, etc.).

Taking the knowledge entry "the business hours of McDonald's are 0:00 to 24:00" as an example, by parsing part-of-speech of the object "0:00-24:00", it may be determined that it refers to a time interval, which matches the "time type", the model acquisition device 120 may determine "time" as the candidate type of the object "0:00-24:00". In an example, the object of a knowledge entry is "100", by parsing part-of-speech of the object "100", it may be determined that it denotes an integer, which matches the "numeric type", and the model acquisition device 120 may determine the "number" as the candidate type of the object "100".

In some embodiments, the model acquisition device 120 may determine a third candidate object type 310-3 of the object in the knowledge entry 111 by predicting the object type having the relationship with the entity. For example, the subject and predicate (i.e., the entity and the relationship) of a knowledge entry are "speed of vehicle", the model acquisition device 120 may predict that the object associated with the "speed of vehicle" may be "X kilometers per hour", and determine that the object type associated with the "speed of vehicle" may be "quantity". It should be understood that, the model acquisition device 120 may use any prediction means known or to-be-developed to predict the candidate type of the object based on both the subject and the predicate in the knowledge entry.

Additionally, or alternatively, in some embodiments, the model acquisition device 120 may, according to semantics of the knowledge entry, determine the object type that best matches the semantics as a fourth candidate object type 310-4. In some embodiments, the model acquisition devices 120 may determine a plurality of entity hypernyms of the entity (i.e., the subject in SPO) and determine a plurality of object hypernyms of the object (i.e., the object in SPO). Then, the model acquisition device 120 may determine, from the plurality of entity hypernyms and the plurality of object hypernyms, a combination of the entity hypernym and the object hypernym having a highest semantic match degree with the knowledge entry, and determine the object hypernym in the combination as the candidate type of the object.

Taking the knowledge entry "the composer of Tenderness is Mayday" as an example, the hypernym of the entity "Tenderness" may include "music", "movie", etc., and the hypernym of the object "Mayday" may include "musician", "restaurant", or "location", etc. According to the semantics of the knowledge entry, the model acquisition device 120 may determine that the combination of the entity hypernym "music" and the object hypernym "musician" best matches the semantics of the knowledge entry, and the model acquisition device 120 may determine "musician" as the candidate type of the object "Mayday".

Additionally, or alternatively, in some embodiments, the model acquisition device 120 may be configured with a predetermined object type set. The model acquisition device 120 may determine whether the object in the knowledge entry matches an object type in the predetermined object type set according to the semantics of the knowledge entry. When the model acquisition device 120 determines that the object in the knowledge entry matches an object type in the predetermined object type set, the model acquisition device 120 may determine the object type matched as a fifth candidate object type 310-5 of the object.

Taking the knowledge entry "the composer of Tenderness is Mayday" as an example, when the predetermined object type set includes the object type "person", and does not include the object type "musician", the model acquisition device 120 may determine the object type "person" as the candidate type of the object "Mayday".

Only exemplary ways of determining the candidate type of the object in the knowledge entry are described above. It should be understood that, embodiments of the present disclosure may also use other means or methods to determine the candidate type of the object in the knowledge entry, which is not limited to the examples described above.

At block 230, an object type for generating a data model that matches the knowledge entry is determined from the plurality of candidate object types based on a preset rule.

In an example, the model acquisition device 120 may determine the object type for generating the data model that matches the knowledge entry from the plurality of candidate object types based on the preset rule. For example, as illustrated in FIG. 3, the model acquisition device 120 may determine the object type 133 corresponding to the knowledge entry 111 from the plurality of candidate object types 310 according to the rule 320. In some embodiments, the model acquisition device 120 may select one of the plurality of candidate object types 310 as the object type 133 according to the rule 320. Alternatively, in some embodiments, the model acquisition device 120 may determine the object type 133 by fusing at least a portion of the plurality of candidate object types 310.

Figure 4:
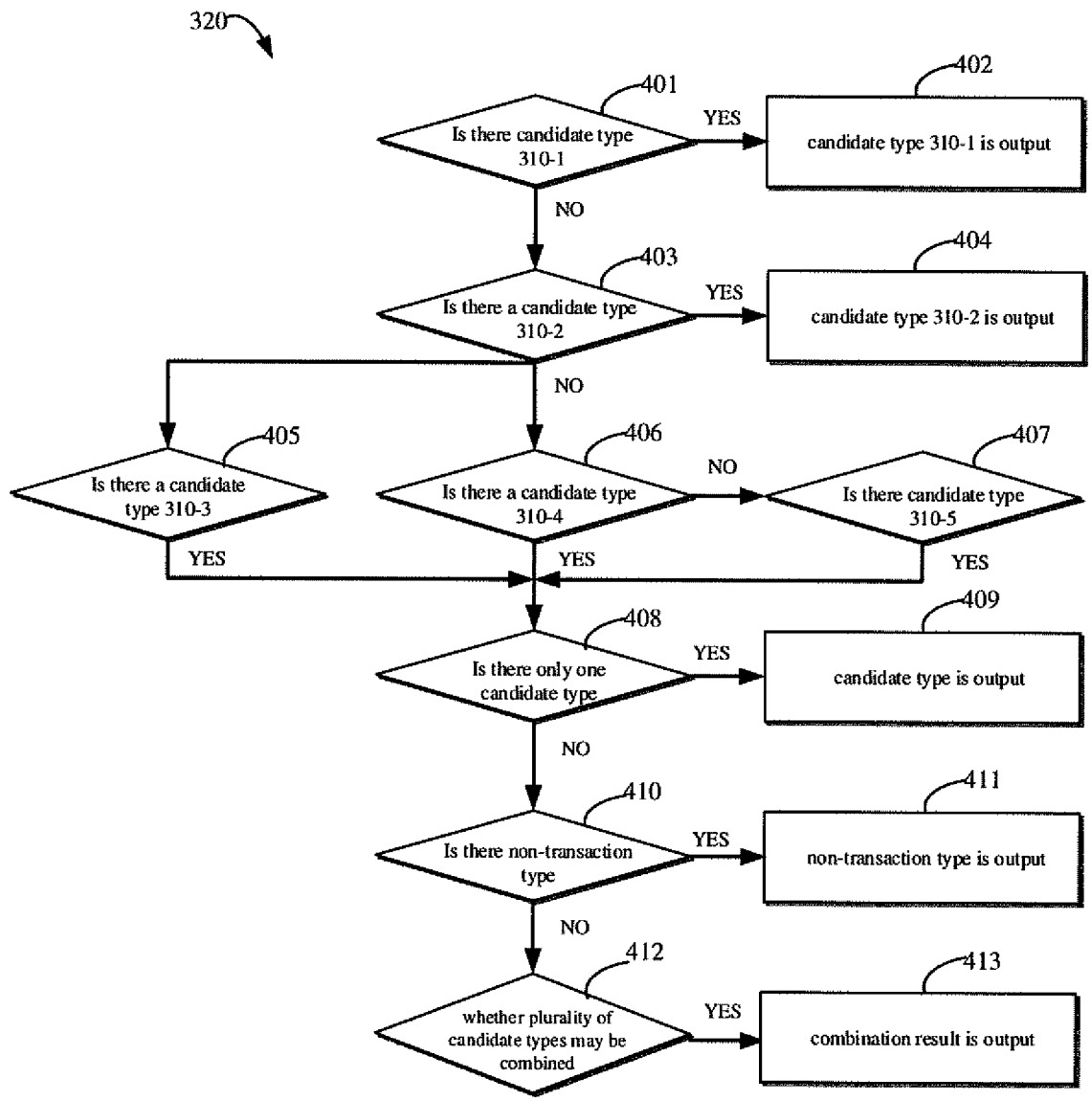
FIG. 4 is a flowchart of an exemplary process of determining an object type for generating a data model from a plurality of candidate object types according to some embodiments of the present disclosure.

FIG. 4 is a flowchart of an exemplary rule 320 according to some embodiments of the present disclosure. It should be understood that, FIG. 4 shows only one exemplary implementation of the rule 320 in FIG. 3, other rules are also feasible, which is not limited in the present disclosure.

As illustrated in FIG. 4, the model acquisition device 120 may determine whether there is the first candidate object type 310-1 (block 401). For example, as described above, the first candidate object type 310-1 may be determined by segmenting the predicate in the knowledge entry. When there is the first candidate object type 310-1, the model acquisition device 120 may output the first candidate object type 310-1 as the object type 133 (block 402).

When there is no first candidate object type 310-1, the model acquisition device 120 may determine whether there is the second candidate object type 310-2 (block 401). For example, as described above, the second candidate object type 310-2 may be a non-transaction type determined based on the part-of-speech of the object in the knowledge entry. When there is the second candidate object type 310-2, the model acquisition device 120 may output the second candidate object type 310-2 as the object type 133 (block 404).

When there is no second candidate object type 310-2, the model acquisition device 120 may determine whether there is the third candidate object type 310-3 (block 405), and whether there is the fourth candidate object type 310-4 (block 406). For example, as described above, the third candidate object type 310-3 may be predicted based on the subject and the predicate in the knowledge entry, and the fourth candidate object type 310-4 may be determined by marking the entity hypernym and the object hypernym according to the semantics of the knowledge entry. When there is no fourth candidate object type 310-4, the model acquisition device 120 may further determine whether there is the fifth candidate object type 310-5 (block 407). For example, as described above, the fifth candidate object type 310-5 may be determined by matching with the object type in the predetermined object type set according to the semantics of the knowledge entry.

In an example, the model acquisition device 120 may determine whether there is only one candidate object type in the third candidate object type 310-3, the fourth candidate object type 3104 and/or the fifth candidate object type 310-5 (block 408), when there is only one candidate object type, the model acquisition device 120 may output it as the object type 133 (block 409).

When the model acquisition device 120 determines that there are both the third candidate object type 310-3 and the fourth candidate object type 310-4, or there are both the third candidate object type 310-3 and the fifth candidate object type 310-5, the model acquisition device 120 may further determine whether there is a non-transaction type in the plurality of candidate object types (block 410). If yes, the model acquisition device 120 may output the non-transaction type as the object type 133 (block 411), the non-transaction type may be preferentially selected.

Additionally, or alternatively, in some embodiments, when the model acquisition device 120 determines that there are a plurality of non-transaction types in the plurality of candidate object types, the model acquisition device 120 may output a non-transaction type having a highest priority according to the predetermined priority of each of the plurality of non-transaction types. In some embodiments, an order of the priorities of the plurality of non-transaction types may be, for example, text>number>quantity>time>enumeration. It should be understood that, in other embodiments, the order of priorities of the plurality of non-transaction types may be different from the above order, which is not limited in the present disclosure.

When the model acquisition device 120 determines that there is no non-transaction type in the plurality of candidate object types, the model acquisition device 120 may determine whether the plurality of candidate object types may be combined (block 412). For example, the model acquisition device 120 may determine whether there is a common hypernym (also referred to as a "combination result") of the plurality of candidate object types. For example, the common hypernym of "person" and "movie" may be "thing". When the model acquisition device 120 determines that the plurality of candidate object types have a common hypernym, the model acquisition device 120 may output the common hypernym as the object type 133 (block 413).

In the above manners, the model acquisition device 120 may determine the object type 133 for generating the data model 130.

Returning to FIG. 2, at block 240, the model acquisition device 120 may generate the data model 130 based at least on the object type 133. In some embodiments, for example, the model acquisition device 120 may use any method or technique known or to-be-developed to determine the entity type 131 and the relationship 132. The model acquisition device 120 may generate the data model 130 that matches the knowledge entry 111 based on the combination of the entity type 131, the relationship 132 and the object type 133.

For a plurality of knowledge entries from different data sources, the model acquisition device 120 may determine a plurality of data models that match these plurality of knowledge entries by the method 200 illustrated in FIG. 2. However, there may be several data models with the same entity type and relationship but different object types in the plurality of data models determined. In some cases, these data models may be merged, such that the generalization degree of the object type in the constructed data model is appropriate, neither too general nor too detailed. The processing for such a scenario is described in detail below in combination with FIG. 5.

Figure 5:
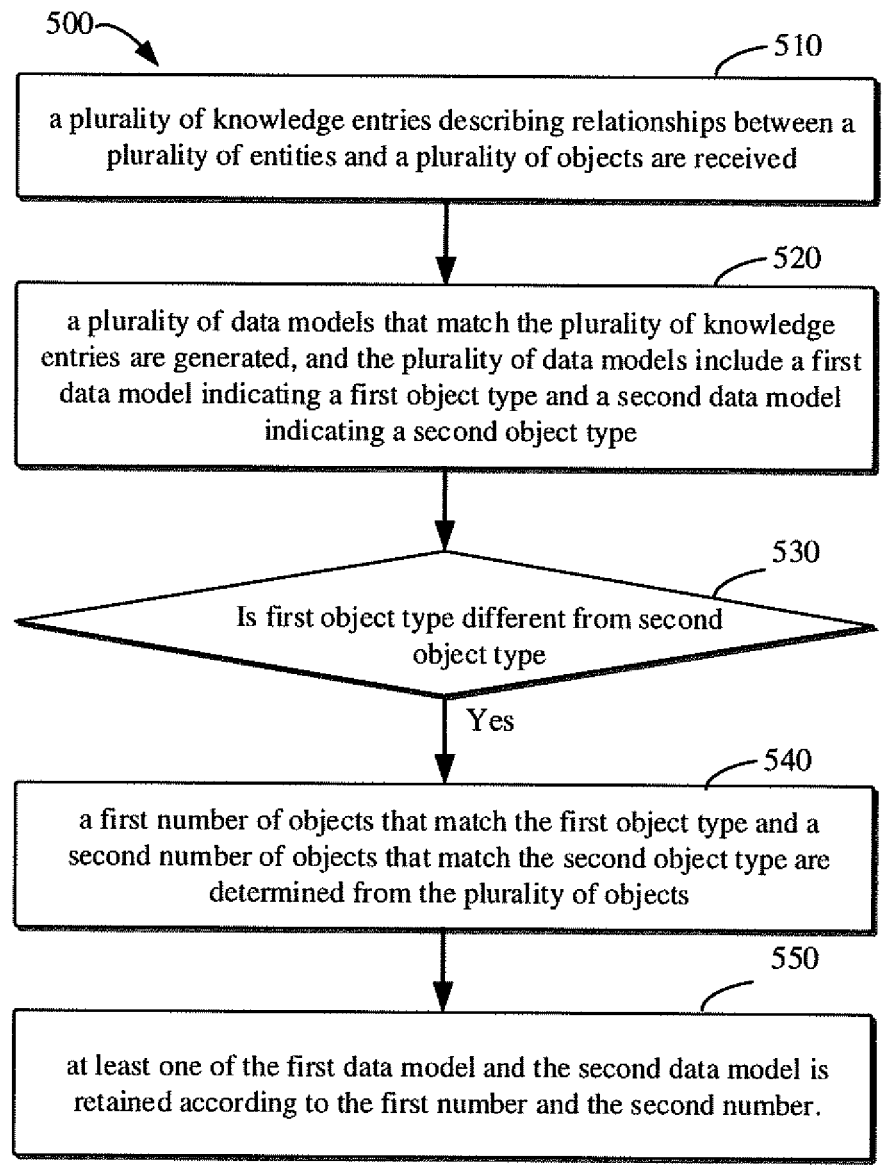
FIG. 5 is a flowchart of a method for acquiring a data model in a knowledge graph according to some embodiments of the present disclosure.

FIG. 5 is a flowchart of a method 500 for acquiring a data model in a knowledge graph according to some embodiments of the present disclosure. For example, the method 500 may be performed by the model acquisition device 120 illustrated in FIG. It should be understood that, the method 500 may also include additional blocks not shown, and/or the blocks shown may be omitted, the present disclosure is not limited in this respect.

At block 510, a plurality of knowledge entries describing relationships between a plurality of entities and a plurality of objects are received.

At block 520, a plurality of data models that match the plurality of knowledge entries are generated.

In an example, the model acquisition device 120 may receive a plurality of knowledge entries describing relationships between a plurality of entities and a plurality of objects, and generate a plurality of data models that match the plurality of knowledge entries.

In some embodiments, for each of the plurality of knowledge entries received, the model acquisition device 120 may generate a corresponding data model by the method 200 illustrated in FIG. 2, and then the model acquisition device 120 may perform deduplication on the generated data models to obtain the plurality of different data models matching the plurality of knowledge entries.

In some embodiments, the plurality of data models determined by the model acquisition device 120 may include, for example, a first data model and a second data model, the first data model indicates a first object type having a first relationship with a first entity type, and the second data model indicates a second object type having the first relationship with the first entity type. For example, the first data model may be "music-composer-person", and the second data model may be "music-composer-musician", both of which have the same entity type "music", and the same relationship "composer", and the object types are "person" (i.e., the first object type) and "musician" (i.e., the second object type), respectively.

At block 530, it is determined whether the first object type in the first data model is the same as the second object type in the second data model.

At block 540, a first number of objects that match the first object type and a second number of objects that match the second object type are determined from the plurality of objects, in response to determining that the first object type is different from the second object type.

In an example, the model acquisition device 120 may determine whether the first object type in the first data model is the same as the second object type in the second data model, when the first object type is different from the second object type, the model acquisition device 120 may determine, from the plurality of objects that the plurality of knowledge entries involved in, the first number of objects that match the first object type and the second number of objects that match the second object type.

In some embodiments, the model acquisition device 120 may perform deduplication on all objects involved in the received multiple knowledge entries, to determine the total number of non-repeating objects involved in the plurality of knowledge entries. Then, the model acquisition device 120 may further determine the first number of objects covered by the first object type (i.e., "person"), and the second number of objects covered by the second object type (i.e., "musician"). For example, the number of the objects covered by the first object type "person" is 101, and the number of the objects covered by the second object type "musician" is 100.

At block 550, the model acquisition device 120 may retain at least one of the first data model and the second data model according to the first number and the second number.

For example, in the above example, the first object type "person" is a hypernym of the second object type "musician". In some embodiments, when the first object type is the hypernym of the second object type, the model acquisition device 120 may determine whether a ratio of the second number to the first number is greater than a preset threshold. When the ratio is greater than the preset threshold, the model acquisition device 120 may retain the second data model indicating the second object type, and remove the first data model indicating the first object type from the plurality of data models. Taking the above example as an example, the ratio of the second number to the first number is 100/101, when the preset threshold is, for example, 0.8 (or other value), due to 100/101>0.8, the model acquisition device 120 may remove the first data model "music-composer-person" from the plurality of data models, and retain the second data model "music-composer-musician" only. Additionally, or alternatively, in some embodiments, when the ratio of the second number to the first number is less than or equal to the preset threshold, the model acquisition device 120 may retain both the first data model and the second data model.

In some embodiments, the model acquisition device 120 may iteratively perform operations of blocks 530-550 for the plurality of data models determined at block 520, so as to ensure the generalization degree of the object type in the constructed data model is appropriate, neither too general nor too detailed.

With the solution for acquiring a data model in the knowledge graph according to embodiments of the present disclosure, the object type can be automatically summarized and mined from knowledge entries in the SPO form, the data model in the knowledge graph may be efficiently constructed while effectively reducing labor costs, and the object type in the data model automatically constructed can have an appropriate degree of generalization in addition to eliminating external dependencies.

Figure 6:
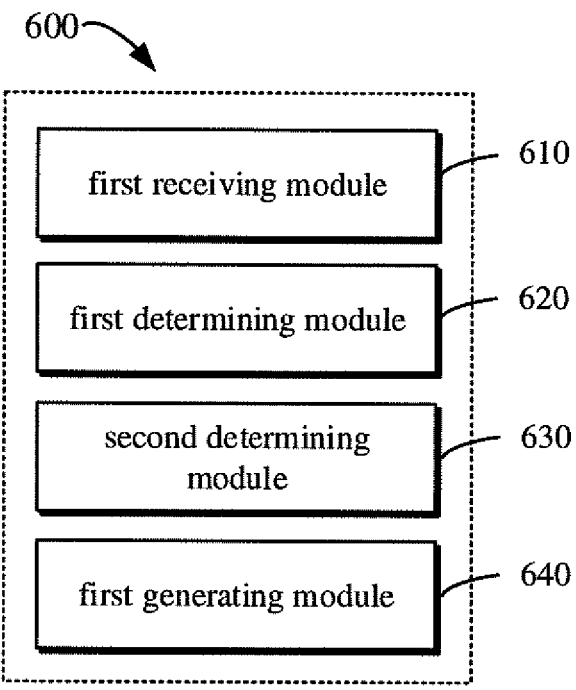
FIG. 6 is a block diagram of a device for acquiring a data model in a knowledge graph according to some embodiments of the present disclosure.

FIG. 6 is a block diagram of a device 600 for acquiring a data model in a knowledge graph according to some embodiments of the present disclosure. The device 600 may be configured to implement the model acquisition device 120 illustrated in FIG. 1. As illustrated in FIG. 6, the device 600 may include a first receiving module 610, a first determining module 620, a second determining module 630, and a first generating module 640. The first receiving module 610 is configured to receive a knowledge entry describing a relationship between an entity and an object. The first determining module 620 is configured to determine a plurality of candidate object types of the object according to at least one of the entity, the relationship and the object. The second determining module 630 is configured to determine an object type for generating a data model that matches the knowledge entry from the plurality of candidate object types based on a preset rule. The first generating module 640 is configured to generate the data model based at least on the object type.

In some embodiments, the first determining module 620 is further configured to divide a phrase describing the relationship in the knowledge entry into a plurality of words; and determine a first candidate object type of the object based on one of the plurality of words.

In some embodiments, the first determining module 620 is further configured to: determine a part-of-speech of a phrase describing the object in the knowledge entry; determine whether the object matches a predetermined non-transaction type according to the part-of-speech; and determine the predetermined non-transaction type as a second candidate object type of the object in response to determining that the object matches the predetermined non-transaction type.

In some embodiments, the predetermined non-transaction type includes one of: a text type, a time type, a numeric type, a quantity type, and an enumeration type.

In some embodiments, the first determining module 620 is further configured to determine a third candidate object type of the object by predicting an object type having the relationship with the entity.

In some embodiments, the first determining module 620 is further configured to: determine a plurality of entity hypernyms of the entity; determine a plurality of object hypernyms of the object; determine, from the plurality of entity hypernyms and the plurality of object hypernyms, a combination of the entity hypernym and the object hypernym having a highest semantic match degree with the knowledge entry; and determine a fourth candidate object type of the object according to the object hypernym in the combination.

In some embodiments, the first determining module 620 is further configured to determine whether the object matches an object type in a predetermined object type set based on semantics of the knowledge entry; and determine the object type matched as a fifth candidate object type of the object in response to determining that the object matches the object type in the predetermined object type set.

In some embodiments, the second determining module 630 is further configured to select one of the plurality of candidate object types as the object type for generating the data model based on the preset rule.

In some embodiments, the plurality of candidate object types at least include a sixth candidate object type and a seventh candidate object type, and the second determining module 630 is further configured to: determine a common hypernym of the sixth candidate object type and the seventh candidate object type; and determine the object type for generating the data model based on the common hypernym.

In some embodiments, the device 600 further includes a second receiving module, a second generating module, a third determining module, and a retaining module.

The second receiving module is configured to receive a plurality of knowledge entries describing relationships between a plurality of entities and a plurality of objects. The second generating module is configured to generate a plurality of data models that match the plurality of knowledge entries. The plurality of data models includes at least a first data model and a second data model, the first data model indicates a first object type having a first relationship with a first entity type, and the second data model indicates a second object type having the first relationship with the first entity type. The third determining module is configured to determine, from the plurality of objects, a first number of objects that match the first object type and a second number of objects that match the second object type, in response to determining that the first object type is different from the second object type. The retaining module is configured to retain at least one of the first data model and the second data model based on the first number and the second number.

In some embodiments, the retaining module is further configured to: determine whether a ratio of the second number to the first number is greater than a preset threshold in response to determining that the first object type is a hypernym of the second object type; retain the second data model, and remove the first data model from the plurality of data models, in response to determining that the ratio is greater than the preset threshold; and retain both the first data model and the second data model in response to determining that the ratio is less than or equal to the preset threshold.

It should be understood that, each module in the device 600 corresponds to block in the method 200 described with reference to FIG. 2 and/or the method 500 described with reference to FIG. 5, respectively, and has the same effect as corresponding operations and features in the method 200 and/or 500, and detailed description of the device 600 is not repeated herein.

Furthermore, the modules and/or units included in the device 600 may be implemented in a variety of manners, including software, hardware, firmware, or any combination thereof. In some embodiments, one or more units may be implemented with software and/or firmware, such as machine-executable instructions stored on a storage medium. In addition to machine-executable instructions or alternatively, some or all of the units in the device 600 may be implemented, at least in part, by one or more hardware logic components. By way of example and not limitation, exemplary hardware logic components that may be used include a Field Programmable Gate Array (FPGA), an Application Specific Integrated Circuit (ASIC), an Application Specific Standard Parts (ASSP), a System on Chip (SOC), a Complex Programmable Logic Device (CPLD), and so on.

The modules and/or units shown in FIG. 6 may be implemented in part or in whole as hardware modules, software modules, firmware modules, or any combination thereof. In particular, in some embodiments, the processes, methods or processes described above may be implemented by a storage system, a host corresponding to the storage system or hardware in other computing devices independent of the storage system.

Figure 7:
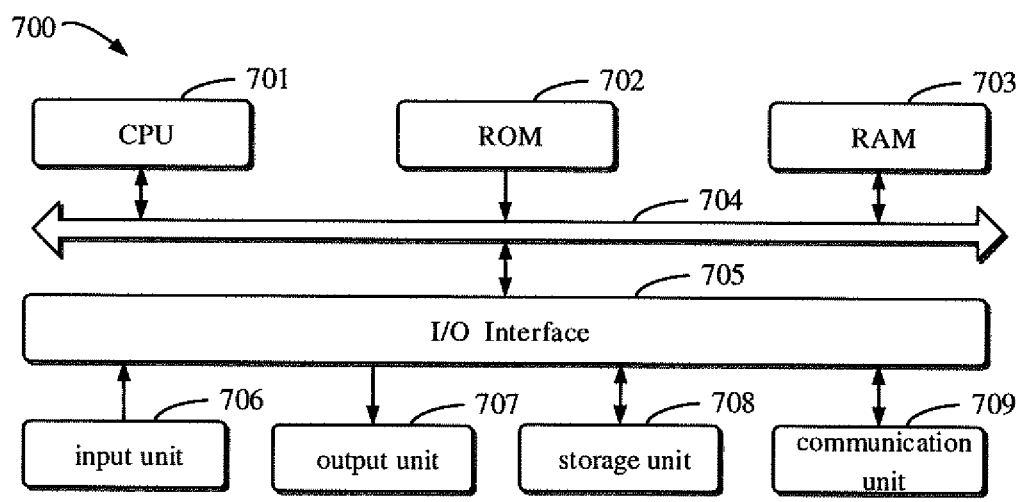
FIG. 7 is a block diagram of a computing device for implementing some embodiments of the present disclosure.

FIG. 7 is a block diagram of an exemplary device 700 for implementing some embodiments of the present disclosure. The device 700 may be configured to implement the model acquisition device 120 as described in FIG. 1. As illustrated in the figure, the device 700 includes a central processing unit (CPU) 701, which may perform various suitable actions and processes in accordance with computer program instructions stored in a read only memory (ROM) 702 or loaded from a storage unit 708 into a random-access memory (RAM) 703. In the RAM 703, various programs and data necessary for operations of the device 700 may also be stored. The CPU 701, the ROM 702, and the RAM 703 are connected to each other through a bus 704. An input/output (I/O) interface 705 is also connected to the bus 704.

A number of components in the device 700 are connected to the I/O interface 705, including: an input unit 706 such as a keyboard, a mouse, and the like; an output unit 707 such as various types of displays, speakers, etc.; the storage unit 708 such as a magnetic disk, an optical disk, or the like; and a communication unit 709 such as a network card, a modem, a wireless communication transceiver, and so on. The communication unit 709 allows the device 700 to exchange information/data with other devices via a computer network such as the Internet and/or various telecommunications networks.

The processing unit 701 performs the various methods and processes described above, such as the method 200 and/or the method 500. For example, in some embodiments, the method 200 and/or the method 500 may be implemented as a computer software program tangibly embodied on a machine-readable medium, such as the storage unit 708. In some embodiments, some or all of the computer programs may be loaded and/or installed onto the device 700 via the ROM 702 and/or the communication unit 709. When a computer program is loaded onto the RAM 703 and executed by the CPU 701, one or more steps in the method 200 and/or the method 500 described above may be performed. Alternatively, in other embodiments, the CPU 701 may be configured to perform the method 200 and/or the method 500 in any other suitable manner (e.g., by way of the firmware).

The functions described herein above may be performed, at least in part, by one or more hardware logic components. For example, and without limitation, exemplary types of the hardware logic components that may be used include: a field programmable gate array (FPGA), an application specific integrated circuit (ASIC), an application specific standard product (ASSP), a system on chip (SOC), a complex programmable logic device (CPLD), and the like.

Program codes for performing the method in the present disclosure may be written in any combination of one or more programming languages. These program codes may be provided to a processor or controller in a general-purpose computer, a special purpose computer, or other programmable data processing devices, such that the program codes, when executed by the processor or controller, are configured to implement functions/operations specified in the flow chart and/or block diagrams. The program code may be executed entirely on a machine, partly on the machine, as a separate software package, partly on the machine, partly on a remote computer, or entirely on the remote computer or server.

In the context of the present disclosure, the machine-readable medium may be a tangible medium that may contain, or store a program for use by or in combination with an instruction execution system, a device, or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of the machine-readable storage medium may include: an electrical connection having one or more wires, a portable computer disk, a hard disk, a random access memory (RAM), a read only memory (ROM), an Erasable Programmable Read Only Memory (EPROM or a flash memory), an optical fiber, a compact disc read-only memory (CD-ROM), an optical memory component, a magnetic memory component, or any suitable combination thereof.

Moreover, while operations are described in a particular order, this should be understood as that the operations are required to be performed in a particular illustrated order or in a sequential order, or that all illustrated operations are required to be performed to achieve desirable results. In certain circumstances, multitasking and parallel processing may be advantageous. Likewise, while several specific implementation details are included in the above discussion, these should not be construed as limiting the scope of the present disclosure. Certain features described in the context of separate embodiments may also be implemented in combination in a single implementation. Conversely, features that are described in the context of the single implementation may also be implemented in a plurality of implementations separately or in any suitable sub-combination.

Although the subject matter has been described in a language specific to structural features and/or methodological acts, it is to be understood that the subject matter defined in the attached claims is not necessarily limited to the specific features or acts described above. Instead, the specific features and acts described above are merely exemplary forms for implementing the attached claims.

What is claimed is:

1. A method for acquiring a data model in a knowledge graph, comprising:
   receiving a knowledge entry describing a relationship between an entity and an object;
   determining a plurality of candidate object types of the object according to at least one of the entity, the relationship and the object;
   determining an object type for generating a data model that matches the knowledge entry from the plurality of candidate object types based on a preset rule; and
   generating the data model based at least on the object type;
   wherein the plurality of candidate object types comprise at least a sixth candidate object type and a seventh candidate object type, and determining the object type for generating the data model from the plurality of candidate object types comprises:
   determining a common hypernym of the sixth candidate object type and the seventh candidate object type; and
   determining the object type for generating the data model based on the common hypernym.

2. The method according to claim 1, wherein determining the plurality of candidate object types comprises:
   dividing a phrase describing the relationship in the knowledge entry into a plurality of words; and
   determining a first candidate object type of the object based on one of the plurality of words.

3. The method according to claim 1, wherein determining the plurality of candidate object types comprises:
   determining a part-of-speech of a phrase describing the object in the knowledge entry;
   determining whether the object matches a predetermined non-transaction type according to the part-of-speech; and
   determining the predetermined non-transaction type as a second candidate object type of the object in response to determining that the object matches the predetermined non-transaction type.

4. The method according to claim 3, wherein the predetermined non-transaction type comprises one of: a text type, a time type, a numeric type, a quantity type, and an enumeration type.

5. The method according to claim 1, wherein determining the plurality of candidate object types comprises:
   determining a third candidate object type of the object by predicting an object type having the relationship with the entity.

6. The method according to claim 1, wherein determining the plurality of candidate object types comprises:
   determining a plurality of entity hypernyms of the entity;
   determining a plurality of object hypernyms of the object;
   determining, from the plurality of entity hypernyms and the plurality of object hypernyms, a combination of the entity hypernym and the object hypernym having a highest semantic match degree with the knowledge entry; and
   determining a fourth candidate object type of the object according to the object hypernym in the combination.

7. The method according to claim 1, wherein determining the plurality of candidate object types comprises:
   determining whether the object matches an object type in a predetermined object type set based on semantics of the knowledge entry; and
   determining the object type matched as a fifth candidate object type of the object in response to determining that the object matches the object type in the predetermined object type set.

8. The method according to claim 1, wherein determining the object type for generating the data model from the plurality of candidate object types comprises:
   selecting one of the plurality of candidate object types as the object type for generating the data model based on the preset rule.

9. The method according to claim 1, further comprising:
   receiving a plurality of knowledge entries describing relationships between a plurality of entities and a plurality of objects;
   generating a plurality of data models that match the plurality of knowledge entries, the plurality of data models comprising at least a first data model and a second data model, the first data model indicating a first object type having a first relationship with a first entity type, and the second data model indicating a second object type having the first relationship with the first entity type;

determining, from the plurality of objects, a first number of objects that match the first object type and a second number of objects that match the second object type, in response to determining that the first object type is different from the second object type; and retaining at least one of the first data model and the second data model based on the first number and the second number.

10. The method according to claim 9, retaining at least one of the first data model and the second data model comprises:

determining whether a ratio of the second number to the first number is greater than a preset threshold in response to determining that the first object type is a hypernym of the second object type;

retaining the second data model, and removing the first data model from the plurality of data models, in response to determining that the ratio is greater than the preset threshold; and retaining both the first data model and the second data model in response to determining that the ratio is less than or equal to the preset threshold.

11. A device for acquiring a data model in a knowledge graph, comprising:

one or more processors; and a storage device, configured to store one or more programs, wherein when the one or more programs are executed by the one or more processors, the one or more processors are caused to:

receive a knowledge entry describing a relationship between an entity and an object;

determine a plurality of candidate object types of the object according to at least one of the entity, the relationship and the object;

determine an object type for generating a data model that matches the knowledge entry from the plurality of candidate object types based on a preset rule; and generate the data model based at least on the object type;

wherein the plurality of candidate object types comprise at least a sixth candidate object type and a seventh candidate object type, and the one or more processors are further configured to:

determine a common hypernym of the sixth candidate object type and the seventh candidate object type; and determine the object type for generating the data model based on the common hypernym.

12. The device according to claim 11, wherein the one or more processors are further configured to:

divide a phrase describing the relationship in the knowledge entry into a plurality of words; and determine a first candidate object type of the object based on one of the plurality of words.

13. The device according to claim 11, wherein the one or more processors are further configured to:

determine a part-of-speech of a phrase describing the object in the knowledge entry;

determine whether the object matches a predetermined non-transaction type according to the part-of-speech; and determine the predetermined non-transaction type as a second candidate object type of the object in response to determining that the object matches the predetermined non-transaction type.

14. The device according to claim 13, the predetermined non-transaction type comprises one of: a text type, a time type, a numeric type, a quantity type, and an enumeration type.

15. The device according to claim 11, wherein the one or more processors are further configured to:

determine a third candidate object type of the object by predicting an object type having the relationship with the entity.

16. The device according to claim 11, wherein the one or more processors are further configured to:

determine a plurality of entity hypernyms of the entity;

determine a plurality of object hypernyms of the object;

determine, from the plurality of entity hypernyms and the plurality of object hypernyms, a combination of the entity hypernym and the object hypernym having a highest semantic match degree with the knowledge entry; and determine a fourth candidate object type of the object according to the object hypernym in the combination.

17. The device according to claim 11, wherein the one or more processors are further configured to:

determine whether the object matches an object type in a predetermined object type set based on semantics of the knowledge entry; and determine the object type matched as a fifth candidate object type of the object in response to determining that the object matches the object type in the predetermined object type set.

18. The device according to claim 11, wherein the one or more processors are further configured to:

select one of the plurality of candidate object types as the object type for generating the data model based on the preset rule.

19. A non-transitory computer readable storage medium having a stored thereon computer program that, when executed by a processor, causes a method for acquiring a data model in a knowledge graph to be implemented, the method comprising:

receiving a knowledge entry describing a relationship between an entity and an object;

determining a plurality of candidate object types of the object according to at least one of the entity, the relationship and the object;

determining an object type for generating a data model that matches the knowledge entry from the plurality of candidate object types based on a preset rule; and generating the data model based at least on the object type;

wherein the plurality of candidate object types comprise at least a sixth candidate object type and a seventh candidate object type, and determining the object type for generating the data model from the plurality of candidate object types comprises:

determining a common hypernym of the sixth candidate object type and the seventh candidate object type; and determining the object type for generating the data model based on the common hypernym.

* * * * *